United States Patent
Park et al.

(10) Patent No.: US 9,093,851 B2
(45) Date of Patent: Jul. 28, 2015

(54) BATTERY MODULE INCLUDING A RELAY INSTALLED TO A CASE

(75) Inventors: Shi-Dong Park, Yongin-si (KR);
Tae-Yong Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 597 days.

(21) Appl. No.: 13/402,828

(22) Filed: Feb. 22, 2012

(65) Prior Publication Data

US 2013/0049649 A1    Feb. 28, 2013

(30) Foreign Application Priority Data

Aug. 25, 2011    (KR) .................... 10-2011-0085285

(51) Int. Cl.
  *H02J 7/00*    (2006.01)
  *B60L 3/00*    (2006.01)
  *B60L 3/04*    (2006.01)
  *B60L 11/18*    (2006.01)

(52) U.S. Cl.
  CPC ............. *H02J 7/0045* (2013.01); *B60L 3/0046* (2013.01); *B60L 3/04* (2013.01); *B60L 11/1879* (2013.01); *B60L 2240/545* (2013.01); *B60L 2240/547* (2013.01); *B60L 2240/549* (2013.01); *Y02T 10/7005* (2013.01)

(58) Field of Classification Search
  CPC .... Y02E 60/12; H01M 2/1055; H01M 10/46; H01M 10/425; H02J 7/0045
  USPC ........................................................ 320/112
  See application file for complete search history.

(56) References Cited

U.S. PATENT DOCUMENTS

| | | | |
|---|---|---|---|
| 2003/0231482 A1* | 12/2003 | Naimi et al. ................. | 361/833 |
| 2005/0170245 A1* | 8/2005 | Vartak et al. ................. | 429/209 |
| 2005/0275372 A1* | 12/2005 | Crowell ....................... | 320/112 |
| 2005/0285563 A1* | 12/2005 | Yoneda ........................ | 320/112 |
| 2008/0078058 A1* | 4/2008 | Hsu et al. ...................... | 16/337 |
| 2008/0089038 A1 | 4/2008 | Dali et al. | |

(Continued)

FOREIGN PATENT DOCUMENTS

| JP | 11-260344 | 9/1999 |
|---|---|---|
| KR | 10-2006-0102667 | 9/2006 |
| KR | 10-2008-0033871 | 4/2008 |

(Continued)

OTHER PUBLICATIONS

KIPO Notice of Allowance dated Jun. 28, 2013, for Korean priority Patent application 10-2011-0085285, (5 pages).

(Continued)

*Primary Examiner* — Arun Williams
(74) *Attorney, Agent, or Firm* — Christie, Parker & Hale, LLP (57) ABSTRACT

A battery module including: a battery assembly including a plurality of rechargeable batteries; a case receiving the battery assembly; a battery management system (BMS) managing unit batteries of the battery assembly; and a relay installed to the case on an output line of the battery assembly and including a relay body configured to selectively block a current according to a signal of the BMS; a connection bar connected to the relay body; and an output terminal connected to the relay body via the connection bar and fastened to the case at a location spaced apart from the relay body.

12 Claims, 8 Drawing Sheets

(56) References Cited

U.S. PATENT DOCUMENTS

2009/0166497 A1* 7/2009 Carnevali .................. 248/309.4
2010/0266887 A1 10/2010 Sekino et al.

FOREIGN PATENT DOCUMENTS

| KR | 10-2008-0102547 A | 11/2008 |
| KR | 10-2009-0000301 A | 1/2009 |
| KR | 10-2010-0055477 A | 5/2010 |

OTHER PUBLICATIONS

KIPO Office action dated Dec. 3, 2012, for Korean priority Patent application 10-2011-0085285, (3 pages).

Patent Abstracts of Japan, and English machine translation of Japanese Publication 11-260344 listed above, ( pages).

* cited by examiner

BATTERY MODULE INCLUDING A RELAY INSTALLED TO A CASE

CROSS-REFERENCE TO RELATED APPLICATION

This application claims priority to and the benefit of Korean Patent Application No. 10-2011-0085285, filed on Aug. 25, 2011 in the Korean Intellectual Property Office, the entire content of which is incorporated herein by reference.

BACKGROUND

1. Field

Aspects of embodiments of the present invention relate to a battery module.

2. Description of the Related Art

Generally, a battery module includes a plurality of rechargeable batteries coupled in series.

In the above battery module, and more specifically, in a rechargeable battery module for an electric vehicle or hybrid electric vehicle (HEV), several to tens of unit batteries are alternately recharged and discharged, and therefore it is required to control a charge/discharge operation of the battery modules so as to maintain them in an appropriate operational state.

Accordingly, to reduce damage to the rechargeable battery, the general battery module is installed with a control unit, such as a battery management system (BMS), to manage a state of each rechargeable battery. A relay to block a current during an error of the battery module is installed in addition to the control unit.

The relay is connected to an output line of the battery module, and includes a positive output terminal and a negative output terminal for final output. The positive output terminal and negative output terminal are installed inside a case receiving the rechargeable battery.

However, when an external impact is applied to the battery module, an error of an installation position may be generated according to rotation of the positive output terminal and the negative output terminal connected to the relay.

The above information disclosed in this Background section is only for enhancement of understanding of the background of the described technology and therefore it may contain information that does not form the prior art that is already known in this country to a person of ordinary skill in the art.

SUMMARY

According to an aspect of embodiments of the present invention, a battery module stabilizes a fixing position of an output terminal connected to a relay.

According to an exemplary embodiment of the present invention, a battery module includes: a battery assembly including a plurality of rechargeable batteries; a case receiving the battery assembly; a battery management system (BMS) managing unit batteries of the battery assembly; and a relay installed to the case on an output line of the battery assembly and including a relay body configured to selectively block a current according to a signal of the BMS; a connection bar connected to the relay body; and an output terminal connected to the relay body via the connection bar and fastened to the case at a location spaced apart from the relay body.

The output line may include a positive output line and a negative output line, and the relay may include a first relay connected to the positive output line and a second relay connected to the negative output line.

The output terminal may include a first output terminal and a second output terminal.

The relay body may include a first relay body and a second relay body, the connection bar may include a first terminal connection bar and a second terminal connection bar, and the first relay may include: a positive connection bar connected to the positive output line; the first relay body connected to the positive connection bar, installed to the case, and configured to selectively block the current; and the first terminal connection bar connecting the first relay body and the first output terminal.

The second relay may include: a negative connection bar connected to the negative output line; the second relay body connected to the negative connection bar, installed to the case at a location spaced apart from the first relay body, and configured to selectively block the current; and the second terminal connection bar connecting the second relay body and the second output terminal.

The case may include a protrusion where the output terminal is fastened at the location spaced apart from a position where the relay is installed.

The protrusion may include an insertion groove in which an end portion of the output terminal is inserted to fasten the output terminal to the case. The insertion groove may have a polygonal shape.

The end portion of the output terminal may include a mounting plate having a polygonal shape corresponding to the polygonal shape of the insertion groove.

The insertion groove may include a first mounting unit receiving the mounting plate, and a second mounting unit at an upper side of the first mounting unit and receiving the connection bar.

A fixing groove having a polygonal shape may be formed at a lower surface of the first mounting unit.

The end portion of the output terminal may further include a protrusion that is received in the fixing groove.

The battery module may be adapted for use as a motor-driving power source for propelling an electric vehicle or a hybrid electric vehicle.

According to an aspect of embodiments of the present invention, in a state of fixing an output terminal connected to a relay of a battery module, even if an external impact or a torque is applied, a change of position of a battery does not occur, such that durability of the battery module is improved. As such, a battery module according to embodiments of the present invention is particularly suited for application in an electric vehicle or a hybrid electric vehicle.

BRIEF DESCRIPTION OF THE DRAWINGS

The accompanying drawings, together with the specification, illustrate some exemplary embodiments of the present invention, and, together with the description, serve to explain aspects and principles of the present invention.

| Description of Reference Numerals Indicating Some Elements in the Drawings | |
|---|---|
| 10: battery assembly | 11: rechargeable battery |
| 11a: housing | 11b: positive terminal |
| 11c: negative terminal | 14: bus bar |
| 20: case | 30: BMS |
| 40: relay | 410: first relay |
| 411: positive connection bar | 413: first relay body |
| 415: first terminal connection bar | 417: first output terminal |
| 418, 438: mounting plate | 430: second relay |
| 431: negative connection bar | 433: second relay body |
| 435: second terminal connection bar | 437: second output terminal |
| 450: protrusion | |

DETAILED DESCRIPTION

In the following detailed description, some exemplary embodiments of the present invention are shown and described, by way of illustration. However, as those skilled in the art would realize, the described embodiments may be modified in various different ways, all without departing from the spirit or scope of the present invention. Accordingly, the drawings and description are to be regarded as illustrative in nature and not restrictive.

Figure 1:
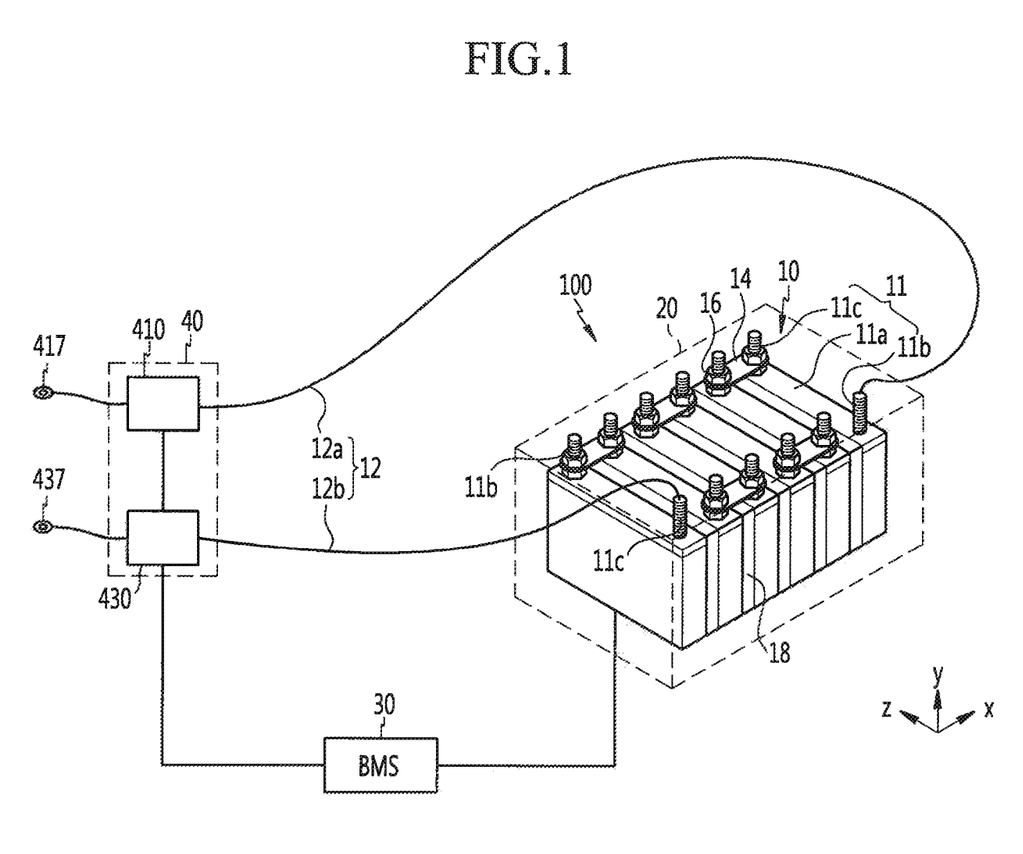
FIG. 1 is a schematic view of a battery module according to an exemplary embodiment of the present invention.

FIG. 1 is a schematic view of a battery module according to an exemplary embodiment of the present invention.

As shown in FIG. 1, a battery module 100 according to an exemplary embodiment of the present invention includes a battery assembly 10 including a plurality of rechargeable batteries 11 that are stacked and arranged, a case 20 receiving the battery assembly 10, a battery management system (BMS) 30 maintaining each rechargeable battery 11 of the battery assembly 10, and a relay 40 installed to the case 20 in an output line of the battery assembly 10.

The battery assembly 10, in one embodiment, relates to the battery module 100 of a large capacity, and includes a plurality of rechargeable batteries 11 that are continuously arranged at intervals (e.g., at predetermined intervals).

Each of the rechargeable batteries 11, in one embodiment, is a lithium ion rechargeable battery and has a generally quadrangular shape, for example. However, the present invention is not limited thereto, and the present invention is applicable to various forms of batteries, such as a lithium polymer battery or a cylindrical battery.

The rechargeable battery 11 includes a housing 11a receiving an electrode assembly (not shown) and a terminal protruded outside the housing 11a. Also, the rechargeable battery 11 may include an exhaust member, or vent, that is opened at a certain pressure (e.g., a predetermined pressure) and emits a gas, although it is not shown in the drawing. The rechargeable battery 11 includes a positive terminal 11b electrically connected to a positive electrode of the electrode assembly, and a negative terminal 11c electrically connected to a negative electrode of the electrode assembly. This rechargeable battery 11 may be configured as a rechargeable battery of a common structure that charges or discharges power, such as of a predetermined amount.

The case 20, in one embodiment, has a substantially cubic prismatic shape, and may be made of a metal, such as aluminum or an aluminum alloy. In one embodiment, the positive terminal 11b electrically connected with the positive electrode of the electrode assembly, and the negative terminal 11c electrically connected with the negative electrode of the electrode assembly protrude from an upper part of the rechargeable battery 11.

A plurality of rechargeable batteries 11 are stacked and arranged in parallel to each other along a direction (e.g., an X-axis direction of FIG. 1) such that wide surfaces of the rechargeable batteries 11 face each other.

The rechargeable batteries 11, in one embodiment, are coupled in series by bus bars 14 in a state in which the positive terminals 11b and the negative terminals 11c of neighboring rechargeable batteries 11 are alternately disposed, and the bus bars 14 are each installed to the positive terminal 11b of one rechargeable battery 11 and the negative terminal 11c of a neighboring rechargeable battery 11.

The bus bar 14, in one embodiment, has holes at both sides in a lengthwise direction for the terminal to be inserted therein. After the bus bar 14 is inserted and installed to the terminals, it may be fixed by a nut 16.

In one embodiment, the battery assembly 10 may include one or more battery cell barriers 18 between neighboring rechargeable batteries 11, and may include battery cell barriers 18 on the outermost rechargeable batteries 11. The battery cell barriers 18 maintain uniform or substantially uniform intervals between the rechargeable batteries 11, allow air communication for temperature control, and support the sides of the respective rechargeable batteries 11.

The BMS 30 is a device that detects a temperature, a current, and a voltage of each rechargeable battery 11 inside the battery module 100. In one exemplary embodiment, a production algorithm for a reference range of a cutoff voltage and a recovery voltage is programmed in the BMS 30 to control operation of the relay 40 according to the voltage value of each rechargeable battery 11.

Figure 2:
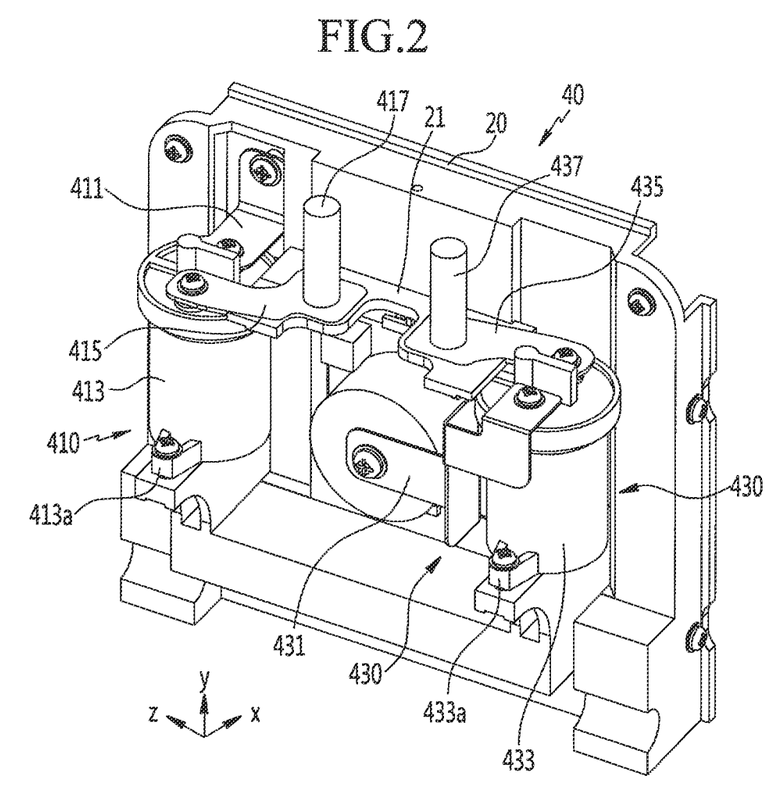
FIG. 2 is a partial perspective view of a state in which a relay is installed to a case of the battery module of FIG. 1.

FIG. 2 is a partial perspective view of a state in which a relay is installed to the case 20 of the battery module 100 receiving the rechargeable batteries 11.

As shown in FIG. 2, the relay 40 is installed on an output line 12 of the battery assembly 10 to be on/off-operated according to a signal of the BMS 30, and thereby a current flowing to the battery module 100 is connected or blocked.

The relay 40, in one embodiment, includes first and second relay bodies 413 and 433 installed to a side of the case 20 and selectively block a current flowing to the battery assembly 10 according to a signal of the BMS 30, and first and second output terminals 417 and 437 installed to the case 20 at positions away from the respective relay bodies 413 and 433.

According to an exemplary embodiment, two relays are installed in the output line 12 of the battery assembly 10. In detail, the relay 40 includes a first relay 410 connected to a positive output line 12a and a second relay 430 connected to a negative output line 12b.

The first relay 410 includes a positive connection bar 411 connected to the positive output line 12a, the first relay body 413 connected to the positive connection bar 411 to be installed to the case 20 and selectively blocking the current, and a first terminal connection bar 415 connecting the first relay body 413 and the first output terminal 417.

The positive connection bar 411 connects the positive output line 12*a* and the first relay body 413. The positive connection bar 411 may be made of a conductive material to be connected to the positive output line 12*a*. A screw hole for connecting the positive output line 12*a* and the first relay body 413 may be formed at both edges of the positive connection bar 411.

In one embodiment, a protrusion coupling portion 413*a* having a screw hole is formed at a side of the first relay body 413, and the first relay body 413 may be screwed to the case 20 at the protrusion coupling portion 413*a*. The first terminal connection bar 415, in one embodiment, is coupled to an upper part of the first relay body 413.

Figure 3:
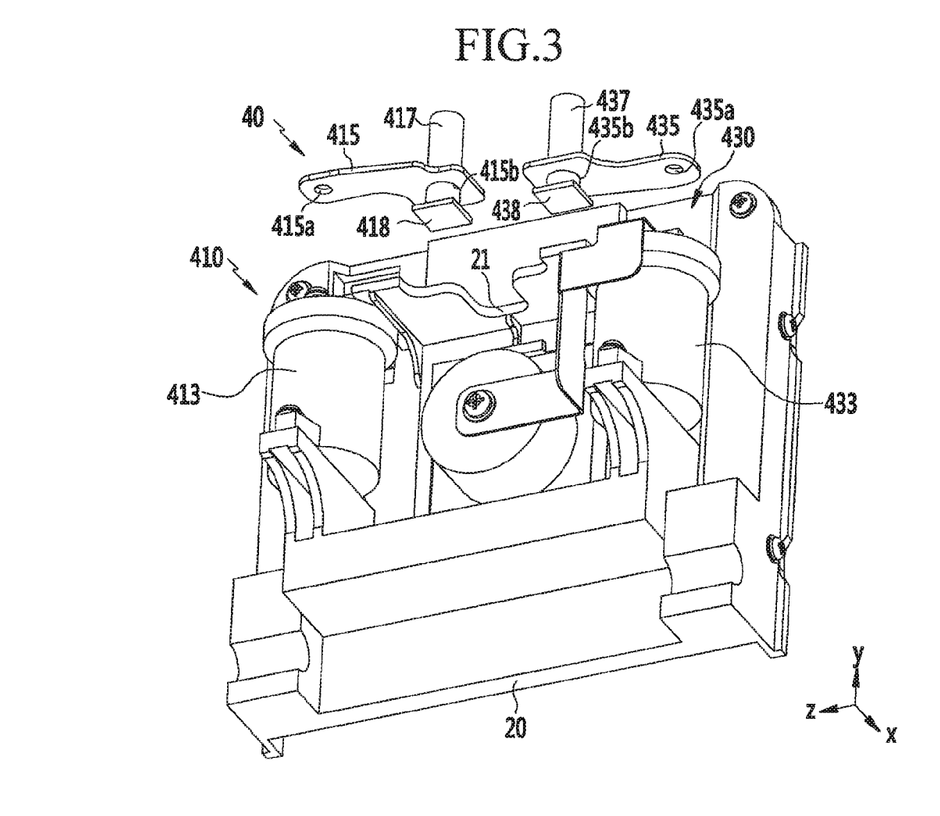
FIG. 3 is a partially exploded perspective view of the relay of FIG. 2, shown having a first terminal connection bar and a second terminal connection bar separated from a relay body.

FIG. 3 is a partially exploded perspective view of the relay 40, shown having the first terminal connection bar 415 and a second terminal connection bar 435 separated from the relay body 413, 433.

As shown in FIG. 3, the first terminal connection bar 415 connects the first relay body 413 and the first output terminal 417. In one embodiment, a screw hole 415*a* is formed at one side of the first terminal connection bar 415 and an inserting hole 415*b* is formed at the other side thereof. Accordingly, one side of the first terminal connection bar 415 may be screwed to the first relay body 413, and the other side of the first terminal connection bar 415 may be coupled to the first output terminal 417 by inserting the first output terminal 417 into the inserting hole 415*b*.

The first output terminal 417 is fixed to the case 20 at a position away from the first relay body 413. In one embodiment, a mounting plate 418 protrudes from the bottom of the first output terminal 417.

The mounting plate 418, in one embodiment, has a polygonal shape and is inserted in and fastened, or captured, to the case 20. The mounting plate 418 is formed with the polygonal shape to prevent or substantially prevent the first output terminal 417 fastened or captured to the case 20 from coming loose due to torque. In one embodiment, an edge portion of the polygonal shape of the mounting plate 418 is hooked and fastened to the case 20. In other embodiments of the present invention, the mounting plate 418 is not limited to a polygonal shape. For example, in one embodiment, a protruded portion (not shown) may be formed at a portion of an edge of a rounded shape to hook and be fastened to the case 20. The case 20, in one embodiment, is formed with an insertion groove 23 for fastening, or capturing, the mounting plate 418.

Figure 4:
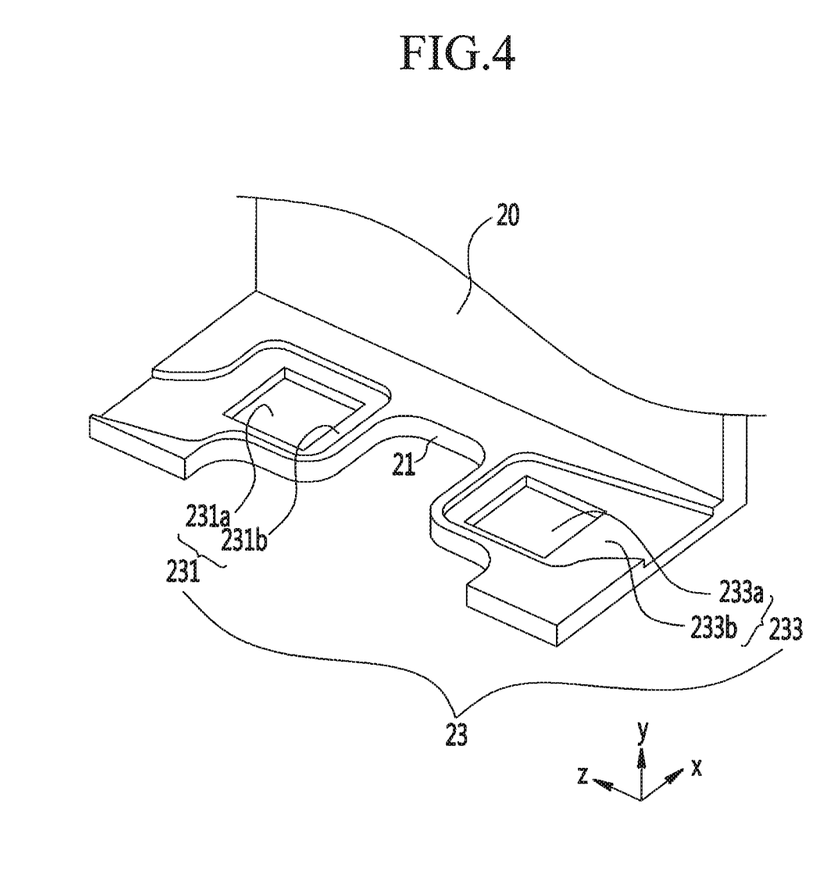
FIG. 4 is a partial perspective view of an insertion groove formed at a protrusion of a case of the battery module of FIG. 1.
Figure 5:
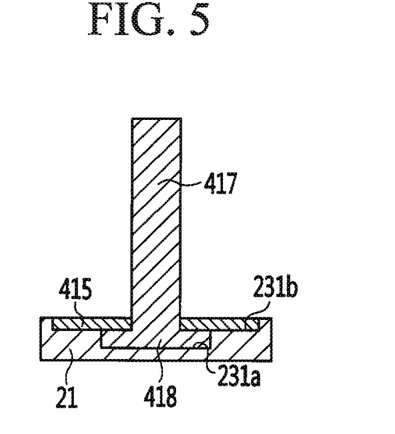
FIG. 5 is a partial cross-sectional view showing a state in which an output terminal of the relay of FIG. 2 is inserted into the insertion groove of FIG. 4.

FIG. 4 is a partial perspective view of an insertion groove formed at a protrusion of a case of the battery module 100, and FIG. 5 is a partial cross-sectional view showing a state in which the output terminal 417 of the relay 40 is inserted into the insertion groove 23.

As shown in FIG. 4 and FIG. 5, the insertion groove 23 is formed at a protrusion 21 of the case 20. The insertion groove 23, in one embodiment, includes a first insertion groove 231 for inserting the first output terminal 417 and a second insertion groove 233 for inserting the second output terminal 437.

The protrusion 21 may protrude to connect portions between the first output terminal 417 and the second output terminal 437, which is described later herein. In one embodiment, the first and second insertion grooves 231 and 233 are formed at both sides of the protrusion 21 such that the mounting plate 418 of the first output terminal 417 and a mounting plate 438 of the second output terminal 437 are fixed, or captured, in the respective insertion grooves 231 and 233.

The first insertion groove 231 has a polygonal groove shape corresponding to the polygonal shape of the mounting plate 418. In one embodiment, the first output terminal 417 and the first terminal connection bar 415 may be inserted together into the first insertion groove 231.

In one embodiment, the first output terminal 417 and the first terminal connection bar 415 are inserted together into the first insertion groove 231, and the first insertion groove 231 includes a first mounting unit 231*a* in which the mounting plate 418 is inserted and fastened and a second mounting unit 231*b* on which the first terminal connection bar 415 is mounted.

The first mounting unit 231*a* is formed at a lower surface of the first insertion groove 231. Also, the second mounting unit 231*b* may have a step formed at an upper side of the first mounting unit 231*a* at a location where the second mounting unit 231*b* is connected to the first mounting unit 231*a*. The mounting plate 418 of the first output terminal 417 is inserted and fastened, or captured, to the first mounting unit 231*a*. Also, the first terminal connection bar 415 may be inserted into the first insertion groove 231 in a state in which the first terminal connection bar 415 is inserted into the first output terminal 417 and contacts a surface of the mounting plate 418.

According to the above-described configuration of an exemplary embodiment of the present invention, even if an external impact is generated, the polygonal mounting plate 418 of the first output terminal 417 is hooked, or captured, to the polygonal portion (i.e. the first mounting unit 231*a*) of the first insertion groove 231 such that first output terminal 417 may not be rotated and is stably fastened.

The second relay 430 is described in further detail below. The second relay 430 may have substantially the same configuration as the first relay 410, and further description of the same components that are described above with respect to the first relay 410 is omitted or is schematically described.

The second relay 430 includes a negative connection bar 431 connected to the negative output line 12*b*, the second relay body 433 connected to the negative connection bar 431 to be installed to the case 20 and selectively blocking the current, and the second terminal connection bar 435 connecting the second relay body 433 and the second output terminal 437.

In one embodiment, the negative connection bar 431 connecting the negative output line 12*b* and the second relay body 433 of the battery assembly 10 includes a screw hole for connecting the negative output line 12*b* and the second relay body 433. The negative connection bar 431 may be bent in multiple steps for a smooth connection with the case 20. The negative connection bar 431 and the negative output line 12*b* may be directly connected or may be connected by a conductive connection member (not shown).

The second relay body 433 is mounted to the case 20 at a position spaced away from a position where the first relay body 413 is installed. In one embodiment, the second relay body 433 may be mounted to the case 20 by a screw at a protrusion coupling portion 433*a* of the second relay body 433.

The second terminal connection bar 435 connects the second relay body 433 and the second output terminal 437. In one embodiment, one side of the second terminal connection bar 435 may be screwed to the second relay body 433 and the second output terminal 437 may be insertedly coupled to the other side of the second terminal connection bar 435.

The second output terminal 437 is fixed to the case 20 at a position away from the second relay body 433. The second output terminal 437 is inserted and fastened, or captured, to the protrusion 21 of the case 20.

The mounting plate 438 (shown in FIG. 3) is formed at a lower end of the second output terminal 437. The mounting plate 438 is fastened, or captured, to the second insertion groove 233 (shown in FIG. 4) formed at the protrusion 21. In one embodiment, the connection of the mounting plate 438 of the second output terminal 437 and the second insertion groove 233 and the operation thereof are the same or substantially the same as the connection of the mounting plate 418 of the first output terminal 417 and the first insertion groove 231, and therefore, further detailed description thereof is omitted.

The second terminal connection bar 435 connects the second relay body 433 and the second output terminal 437. In one embodiment, a screw hole 435a is formed at one side of the second terminal connection bar 435 and an insertion hole 435b is formed at the other side thereof. Here, even though the second terminal connection bar 435 and the first terminal connection bar 415 may be partially different in shape to avoid undesirable contact with neighboring parts, they may have substantially the same structure and function. Accordingly, because the configuration and coupling operation of the second terminal connection bar 435 may be the same or similar to the coupling operation of the first terminal connection bar 415, further detailed description is omitted.

Figure 6:
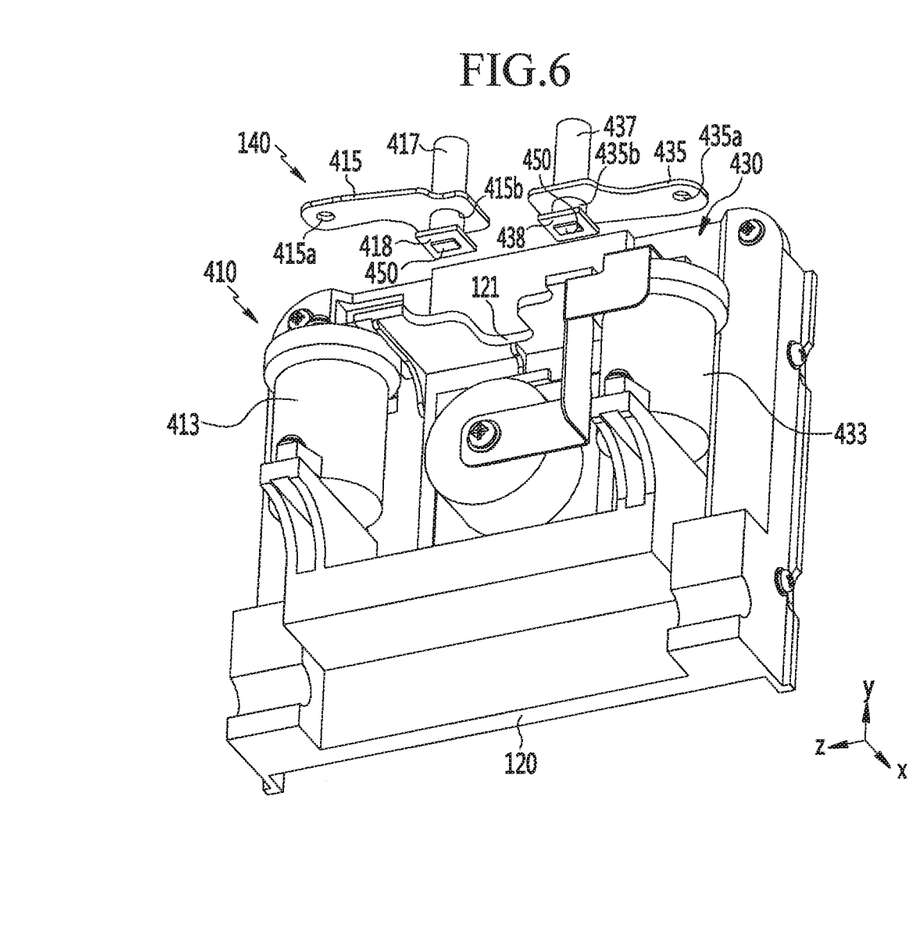
FIG. 6 is a partially exploded perspective view of a relay of a battery module according to another exemplary embodiment of the present invention, shown having a first output terminal and a second output terminal separated from a relay body.
Figure 7:
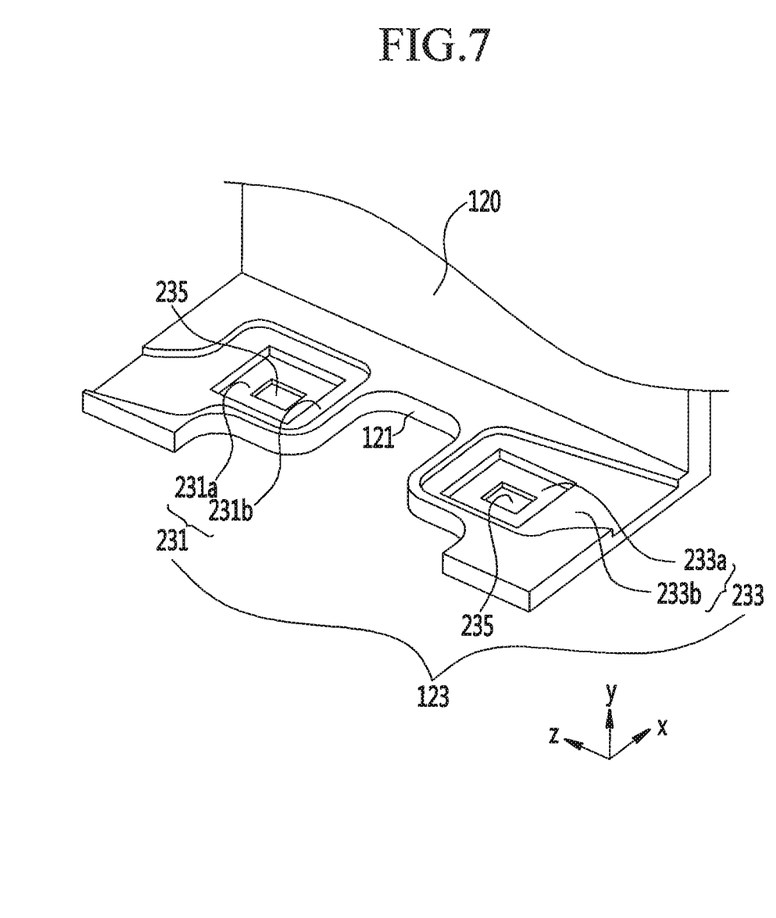
FIG. 7 is a partial perspective view of an insertion groove formed at a protrusion of a case of the battery module of FIG. 6.
Figure 8:
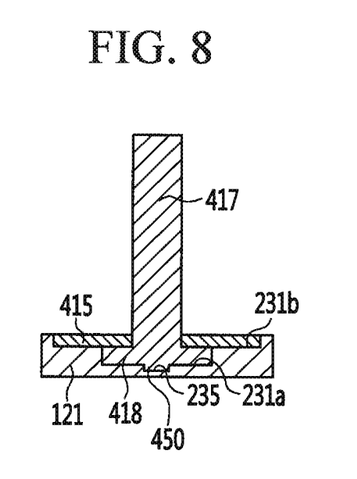
FIG. 8 is a partial cross-sectional view showing a state in which an output terminal of the relay of FIG. 6 is inserted into the insertion groove of FIG. 7.

FIG. 6 is a partially exploded perspective view of a relay 140 of a battery module according to another exemplary embodiment of the present invention, shown having a first output terminal and a second output terminal separated from a relay body; FIG. 7 is a partial perspective view of an insertion groove 123 formed at a protrusion 121 of a case 120 of the battery module of FIG. 6; and FIG. 8 is a partial cross-sectional view showing a state in which an output terminal of the relay of FIG. 6 is inserted into the insertion groove of FIG. 7. Some of the same reference numerals used in FIG. 1 to FIG. 5 are used in FIG. 6 to FIG. 8 to indicate the same components having the same functions. Therefore, further detailed description of the same components will be omitted.

As shown in FIG. 6 to FIG. 8, the first output terminal 417 and the second output terminal 437 of the relay 140 according to another exemplary embodiment of the present invention each includes a protrusion 450.

The protrusion 450 is stably fastened, or captured, in a state in which it is inserted into the insertion groove 123, by being inserted into a fixing groove 235 formed in the insertion groove 123. The protrusion 450 may be protruded having a columnar shape or any other suitable polygonal or other shape for providing fastening, or capturing, (e.g., hook fastening action) of the first output terminal 417 and the second output terminal 437.

In the protrusion 121, the fixing groove 235 is formed at the lower surface of the second mounting units 231b and 233b of the respective first and second insertion grooves 231 and 233. Accordingly, the first output terminal 417 and the second output terminal 437, in a state of being inserted into the respective fixing grooves 235 of the first and second insertion grooves 231 and 233 may smoothly function as hook fasteners.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
    a battery assembly including a plurality of rechargeable batteries;
    a case receiving the battery assembly;
    a battery management system (BMS) managing unit batteries of the battery assembly; and
    a relay installed to the case on an output line of the battery assembly and comprising:
        a relay body fastened to the case at a first location and configured to selectively block a current according to a signal of the BMS;
        a connection bar connected to the relay body; and
        an output terminal connected to the relay body via the connection bar and fastened to the case at a second location spaced apart from the relay body, wherein the output terminal is inserted through an inserting hole of the connection bar and is inserted in an insertion groove of the case at the second location to fasten the output terminal to the case.

2. The battery module of claim 1,
    wherein the output line includes a positive output line and a negative output line, and
    wherein the relay includes:
        a first relay connected to the positive output line; and
        a second relay connected to the negative output line.

3. The battery module of claim 2,
    wherein the relay body includes a first relay body and a second relay body,
    wherein the connection bar includes a first terminal connection bar and a second terminal connection bar,
    wherein the output terminal includes a first output terminal and a second output terminal, and
    wherein the first relay comprises;
        a positive connection bar connected to the positive output line;
        the first relay body connected to the positive connection bar, installed to the case, and configured to selectively block the current; and
        the first terminal connection bar connecting the first relay body and the first output terminal.

4. The battery module of claim 3, wherein the second relay comprises;
    a negative connection bar connected to the negative output line;
    the second relay body connected to the negative connection bar, installed to the case at a location spaced apart from the first relay body, and configured to selectively block the current; and
    the second terminal connection bar connecting the second relay body and the second output terminal.

5. The battery module of claim 3, wherein the case comprises a protrusion where the output terminal is fastened to the case at the second location spaced apart from the relay body.

6. The battery module of claim 5, wherein the protrusion includes the insertion groove in which an end portion of the output terminal is inserted to fasten the output terminal to the case.

7. The battery module of claim 6, wherein the insertion groove has a polygonal shape.

8. The battery module of claim 7, wherein the end portion of the output terminal comprises a mounting plate having a polygonal shape corresponding to the polygonal shape of the insertion groove.

9. The battery module of claim 8, wherein the insertion groove includes:
    a first mounting unit receiving the mounting plate; and
    a second mounting unit at an upper side of the first mounting unit and receiving the connection bar.

10. The battery module of claim 9, wherein a fixing groove having a polygonal shape is formed at a lower surface of the first mounting unit.

11. The battery module of claim 10, wherein the end portion of the output terminal further comprises a protrusion that is received in the fixing groove.

12. The battery module according to claim 1, wherein the battery module is adapted for use as a motor-driving power source for propelling an electric vehicle or a hybrid electric vehicle.

\* \* \* \* \*